United States Patent [19]

Mumola et al.

[11] 3,868,591
[45] Feb. 25, 1975

[54] LASER HEAD FOR SIMULTANEOUS OPTICAL PUMPING OF SEVERAL DYE LASERS

[75] Inventors: Peter B. Mumola; Belton T. McAlexander, both of Newport News, Va.

[73] Assignee: The United States of America as represented by the Administrator of the National Aeronautics and Space Administration, Washington, D.C.

[22] Filed: June 5, 1973

[21] Appl. No.: 367,293

[52] U.S. Cl. .............................. 331/94.5 P, 330/4.3
[51] Int. Cl. ............................................. H01s 3/09
[58] Field of Search .................................. 331/94.5, 330/4.3

[56] References Cited
UNITED STATES PATENTS
3,504,298  3/1970  Baugh, Jr. et al.................. 331/94.5
3,634,777  1/1972  Uchida et al. ...................... 331/94.5

*Primary Examiner*—William L. Sikes
*Attorney, Agent, or Firm*—William H. King; Howard J. Osborn; John R. Manning

[57] ABSTRACT

The invention is a laser head for simultaneous pumping several dye lasers with a single flashlamp. The laser head includes primarily a multi-elliptical cylinder cavity with a single flashlamp placed along the common focal axis of the cavity and with capillary tube dye cells placed along each of the other focal axes of the cavity. The inside surface of the cavity is polished. Hence, the single flashlamp supplies the energy to the several dye cells.

7 Claims, 7 Drawing Figures

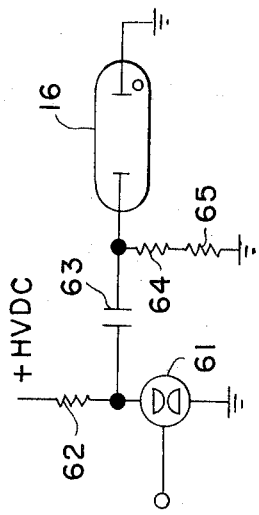
FIG. 7
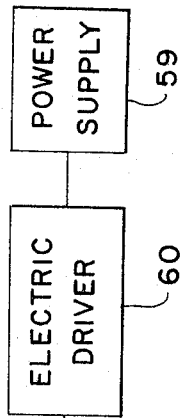
FIG. 6
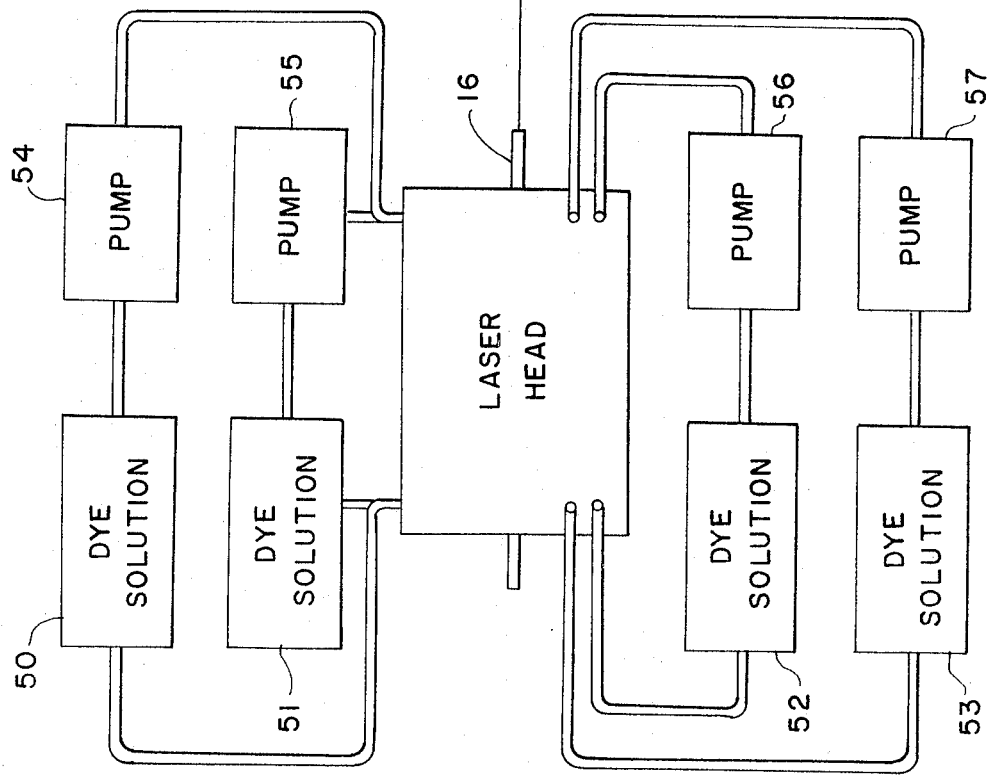

LASER HEAD FOR SIMULTANEOUS OPTICAL PUMPING OF SEVERAL DYE LASERS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The invention relates generally to lasers and more specifically concerns a device that provides simultaneous optical pumping of several lasers.

The laser device, that constitutes this invention, was made for use in conjunction with an experiment to remotely detect the concentration of chlorophyll a in marine algae by laser-induced fluoresence. This experiment requires a laser excitation at several wavelengths spread across the visible spectrum. One way to accomplish this is to employ a separate laser for each wavelength desired. This would require individual laser heads and electrical drive circuits for each laser. The present invention utilizes a multi-elliptical cavity design which allows simultaneous optical pumping of several dye lasers using a single flashlamp and electrical driver.

Multi-elliptical cavities have been previously employed to increase the total optical energy pumped into the common focal axis by using multiple lamps. This scheme is necessary for such laser materials as ruby or neodymium doped glass. It is the primary purpose of the present invention to utilize the prior art miltielliptical cavity to simultaneously pump several dye lasers with a single flashlamp.

SUMMARY OF THE INVENTION

Dye lasers require much less energy to operate than ruby or neodymium doped glass lasers. Hence, in the present invention a single lamp is placed along the common focal axis of a multi-elliptical cylinder cavity and capillary tube dye cells are placed along the other axes of the cavity so that the single lamp supplies optical energy to a plurality of lasers. The dye cells and lamp are held in place by stainless steel end plates which serve several additional purposes: (1) they hold mirrors of each laser cavity, (2) they permit dye solutions to flow through the cells, and (3) they reflect light from polished surfaces to increase pumping efficiency. Stainless steel is used so as to be non-reactive with the solvents such as ethenal and methanal used with the dyes. Optics holders are mounted on the end plates to support and adjust the laser mirrors or windows if externally mounted mirrors are required. The choice of flashlamp and electrical driver depends on the needs of the user.

BRIEF DESCRIPTION OF THE DRAWINGS

FIG. 6 is a schematic drawing of a laser system using the laser head shown in FIG. 1; and FIG. 7 is a schematic drawing of the electrical circuitry used in FIG. 6.

DETAILED DESCRIPTION OF THE INVENTION

Figure 1:
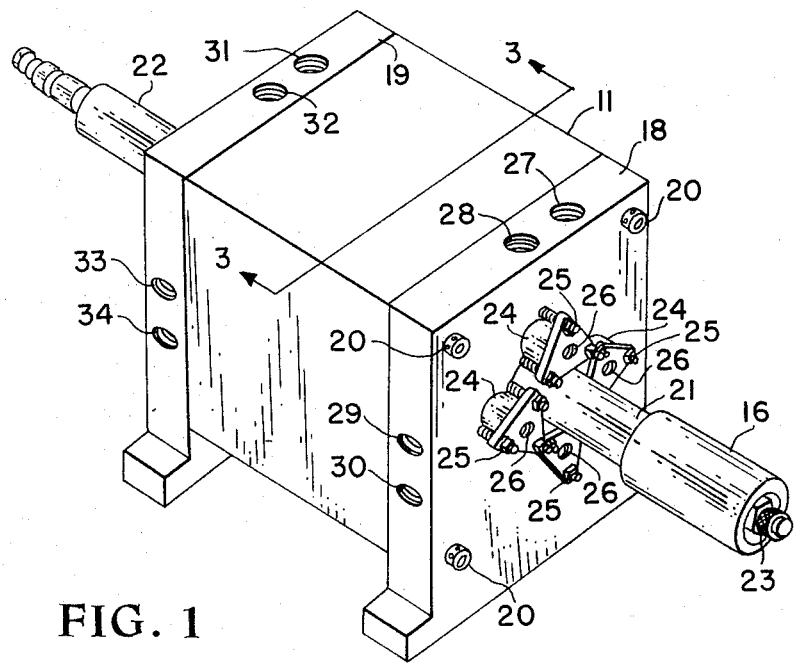
FIG. 1 is a perspective view of the laser head in the invention.
Figure 2:
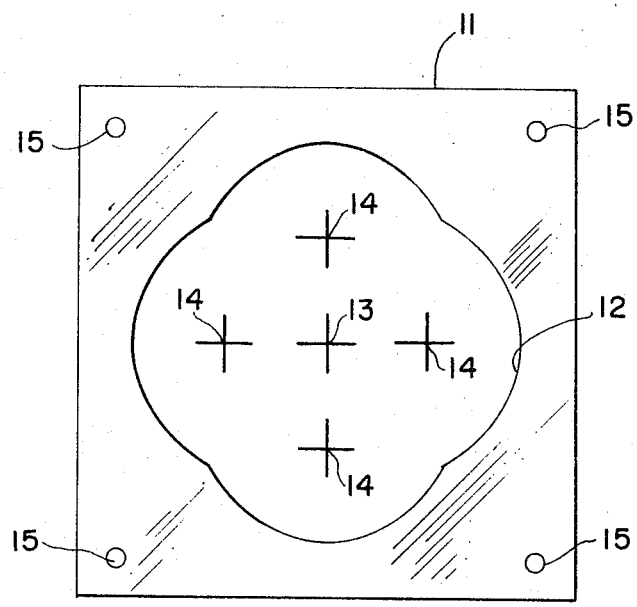
FIG. 2 is an end view of the multi-elliptical cylinder cavity in FIG. 1.

Turning now to the embodiment of the invention selected for illustration in the drawings, the number 11 in FIG. 1 designates a block of aluminum having a 9.906 centimeters square cross-section by 8.890 centimeters long. A cavity 12 is machined into aluminum block 11. As can be seen from FIG. 2, cavity 12 consists of four identical elliptical cylinder cavities with all four having a common focal axis 13 and with each having another focal axis 14. Focal axes 14 are equally spaced around focal axis 13. Each of the four elliptical cylinders has a 5.4 centimater major axis and 0.45 eccentricity. The inside surface of cavity 12 is polished for maximum uniform reflectivity. Even though a four cylinder cavity 12 is disclosed, it is to be understood that a different number of cylinders can be used. The number of cylinders used depends on the number of lasers to be pumped and can be as few as two or more than eight depending on available flashlamp energy and the dye laser medium used. Holes 15 are drilled into block 11 for mounting end plates.

Figure 3:
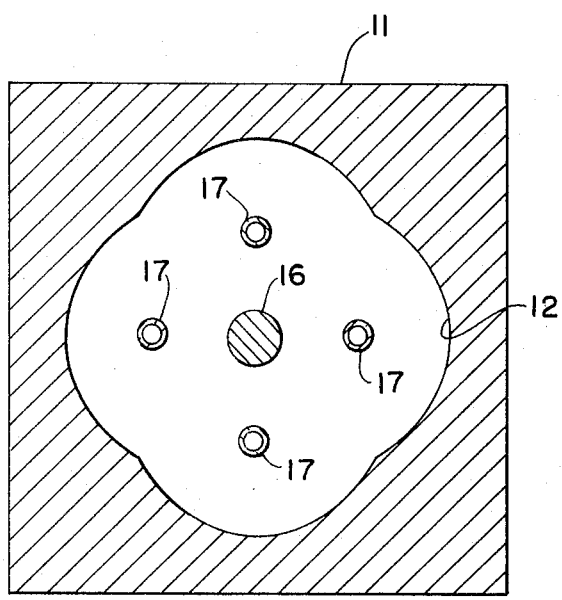
FIG. 3 is a sectional view 3—3 in FIG. 1.

As shown in FIG. 3, a flashlamp 16 is placed inside cavity 12 along common focal axis 13, and dye cells 17, which are 3 millimeters inside diameter by 5 millimeters outside diameter by 89 millimeters long quartz capillary tubes, are placed inside cavity 12 along focal axes 14. Lamp 16 and dye cells 17 are held in place by stainless steel end plates 18 and 19 (FIG. 1) which are mounted on block 11 by means of screws 20. Copper tubes 21 and 22 are mounted on end plates 18 and 19, respectively, to provide mechanical support for flashlamp 16 and to complete the electrical circuit that supplies power to flashlamp 16 by acting as a ground return through the assembled laser head. Power is supplied to flashlamp 16 through a terminal 23. Four windows 24, which are made from quartz, are mounted on each end plate 18 and 19, by means of adjustable brass holders 25. Each holder 25 has an aperature 26 to allow light to pass through. In the present embodiment of the invention each of the windows 24 attached to end plate 18 has one of its surfaces coated with a reflective film so that it acts as a mirror and each of the windows 24 attached to end plate 19 remains uncoated so that it acts as a window. End plate 18 has holes 27, 28, 29 and 30 in it which correspond to holes 31, 32, 33 and 34, respectively, in end plate 19. Corresponding holes in end plates 18 and 19 terminate in one of the dye cells 17. Hence, a different dye solution can be circulated through each of the dye cells 17. Externally mounted mirrors, which can be mounted in conventional holders, are placed beyond the windows 24 to complete the optical cavities for the lasers.

Figures 4, 5:
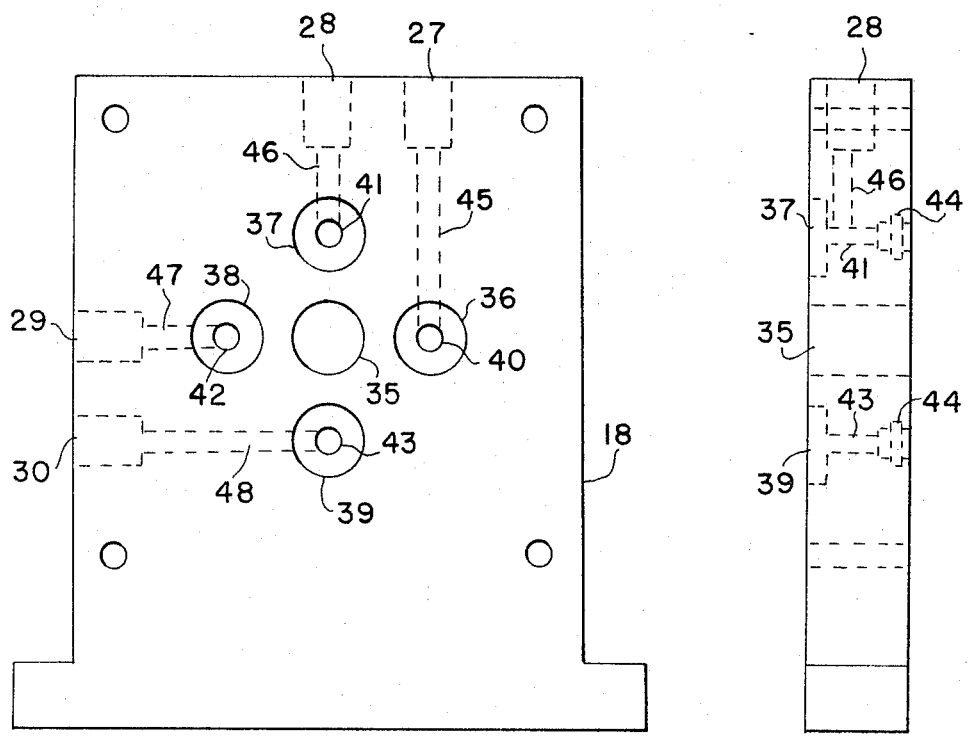
FIG. 4 is a side view of one of the end plates in FIG. 1.
FIG. 5 is an end view of the end plate in FIG. 4.

FIGS. 4 and 5 are side and end views, respectively, of end plate 18. End plate 19 is exactly like end plate 18 except that holes 31–34 are located to correspond to holes 27–30, respectively. A hole 35 is drilled into end plate 18 for the flashlamp 16 to pass through. Holes 36, 37, 38 and 39 are drilled part of the way through the end plate for windows 24 to fit into. Holes 40, 41, 42 and 43 are drilled through the end plate at the center of holes 36–39. Each of the holes 40–43 has a groove 44 cut in it so that one of the dye cells 17 and an O-ring can fit into it to provide a seal for the dye solution contained in the dye cell. Holes 27–30 narrow to holes 45–48, respectively, which in turn terminate in holes 40–43, respectively. The large portions of holes 27–30 have threads in them for receiving a male fitting to connect the dye solutions to the laser head. A dye solution entering hole 28 will flow through holes 46 and 41 into one of the dye cells 17. The dye solution then flows through corresponding holes in end plate 19 and out of hole 32. Dye solutions entering holes 27, 29 and 30 follow similar paths through the laser head.

The laser head that constitutes this invention is shown connected in an operable system in FIG. 6. Four separate supplies of dye solutions 50–53 are pumped by four pumps 54–57 through the four dye cells 17. A power supply 59 and an electric driver 60 are connected to flashlamp 16 to supply pulses of light to the four dye cells 17. Inasmuch as the windows 24 on the right side of the laser head are coated with a reflective film and the windows 24 on the left side of the laser head are not coated, four partially reflecting mirrors are mounted externally (not shown) to complete the laser cavities. These mirrors could serve as windows as well if mounted in place of windows 24. Simultaneous laser emmission from all four lasers would thereby result. External mirror mounts allow insertion of intracavity optical elements if required. Laser pulse energy varies with the choice of dye solution. For reference purposes, with a $5 \times 10^{-4}$ molar solution of Rhodamine 6G in ethanol, one can obtain pulse energies of 25–50 millijoules in a 400 nanosecond pulse.

The electric driver 60 as shown in FIG. 7, consists of a spark gap 61 to which trigger pulses are applied; a current limiting resistor 62; a 0.3 $\mu$f, 25 kv capacitor 63; two 2.2 k ohm 2W resistors 64 and 65; and a 100 Joules input, water cooled, commercially available xenon flashlamp 16.

The advantages of this invention are that it achieves simultaneous multi-laser pumping, it is simple in that fewer components, electrical and mechanical, are needed to simultaneously generate several laser outputs and it is compact, thus opening the possibility for use in airborne or satellite applications.

Many changes can be made in the disclosed embodiment of the invention without departing from the spirit or scope of the invention as defined in the claims. For example, the invention can be modified to pump different numbers of dye lasers simultaneously. Laser materials other than dyes may be substituted, assuming a suitable flashlamp is used to meet the threshold pumping requirements of that material. Also, additional optical elements may be used besides the windows and mirrors shown to control the spectral and/or temporal output of each laser individually.

What is claimed is:

1. A laser device for providing simultaneous optical pumping of a plurality of lasers in a compact, efficient and reliable manner comprising:
    an elongated multi-elliptical cavity having a common focal axis and a plurality of other focal axes spaced around said common focal axis;
    a single flashlamp pumping light source located inside said multi-elliptical cavity along said common focal axis; and
    a different laser located along each of said plurality of other focal axes inside said multi-elliptical cavity whereby the plurality of different lasers are pumped by said single light source.

2. A laser device according to claim 1 wherein the inside surface of said multi-elliptical cavity is polished.

3. A laser device according to claim 2 wherein said plurality of different lasers are dye lasers.

4. A laser head for providing simultaneous pumping of a plurality of dye lasers in a compact, efficient and reliable manner comprising:
    an elongated multi-elliptical cavity having a common focal axis and a plurality of other focal axes spaced around said common focal axis;
    a different dye cell located along each of said plurality of other focal axes inside said multi-elliptical cavity; and
    end plate means located on each end of said multi-elliptical cavity for holding said light source and said dye cells in place; each of said end plate means including window means for each of said dye cells and hole means for circulating a different dye solution through each of said dye cell.

5. A laser head according to claim 4 wherein the inside surface of said elongated multi-elliptical cavity is polished aluminum.

6. A laser head according to claim 5 wherein the end plate means are made from stainless steel so as to be non-reactive with the solvents used with the dyes.

7. A laser head according to calim 6 wherein each of said window means includes a piece of quartz and an aperture.

* * * * *